US012671518B2

(12) United States Patent
Fang et al.

(10) Patent No.: US 12,671,518 B2
(45) Date of Patent: Jun. 30, 2026

(54) METHOD AND SYSTEM OF DYNAMIC OPTICAL INTELLIGENT COMPUTING

(71) Applicant: TSINGHUA UNIVERSITY, Beijing (CN)

(72) Inventors: Lu Fang, Beijing (CN); Tiankuang Zhou, Beijing (CN); Wei Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 431 days.

(21) Appl. No.: 18/459,843

(22) Filed: Sep. 1, 2023

(65) Prior Publication Data

US 2024/0223299 A1    Jul. 4, 2024

(30) Foreign Application Priority Data

Jan. 3, 2023    (CN) ......................... 202310000855.3

(51) Int. Cl.
*H04J 14/08* (2006.01)
*H04L 5/00* (2006.01)

(52) U.S. Cl.
CPC ............ *H04J 14/08* (2013.01); *H04L 5/0025* (2013.01)

(58) Field of Classification Search
CPC ...... H04N 5/238; H04J 14/04; G01B 9/02091
See application file for complete search history.

(56) References Cited

U.S. PATENT DOCUMENTS 5,651,080 A * 7/1997 Chu ................... H04Q 11/0005
398/44
8,405,763 B2 * 3/2013 Veeraraghavan .... H04N 23/617
348/222.1

| | | | | |
|---|---|---|---|---|
| 2002/0027703 A1 * | 3/2002 | Kinoshita | .......... | H04B 10/2941 359/337.1 |
| 2002/0051284 A1 * | 5/2002 | Takatsu | ............... | G06F 12/0866 359/341.1 |
| 2003/0026588 A1 * | 2/2003 | Elder | ....................... | H04N 7/18 386/230 |
| 2004/0218830 A1 * | 11/2004 | Kang | ................... | H04N 23/741 386/E5.069 |
| 2006/0028489 A1 * | 2/2006 | Uyttendaele | .......... | G06T 15/205 345/646 |
| 2011/0293278 A1 * | 12/2011 | Mazed | ................ | H04J 14/0282 398/67 |
| 2012/0224861 A1 * | 9/2012 | Winzer | .............. | H04B 10/2581 398/143 |
| 2013/0070786 A1 * | 3/2013 | Liu | ....................... | H04B 10/516 398/115 |
| 2014/0160488 A1 * | 6/2014 | Zhou | .................... | A61B 5/0066 356/479 |
| 2017/0163971 A1 * | 6/2017 | Wang | .................... | G06T 1/0007 |
| 2019/0026942 A1 * | 1/2019 | Zhang | .................. | G06T 15/205 |
| 2019/0139308 A1 * | 5/2019 | Sun | ........................ | G06T 15/40 |
| 2019/0173604 A1 * | 6/2019 | Xie | .................... | H04Q 11/0062 |
| 2019/0251716 A1 * | 8/2019 | Nelson | ............... | G10L 15/1815 |

* cited by examiner

*Primary Examiner* — Akwasi M Sarpong
*Assistant Examiner* — Michael L Burleson
(74) *Attorney, Agent, or Firm* — Hodgson Russ LLP

(57) ABSTRACT

The method of dynamic optical intelligent computing includes: acquiring a time frame input from a target dynamic scene; obtaining space information corresponding to a time frame by performing a spatial modulation on the time frame; and obtaining an optical time sequence cache corresponding to the time frame by mapping the space information to an optical time sequence based on a SMUX technology and a WMUX technology.

18 Claims, 10 Drawing Sheets

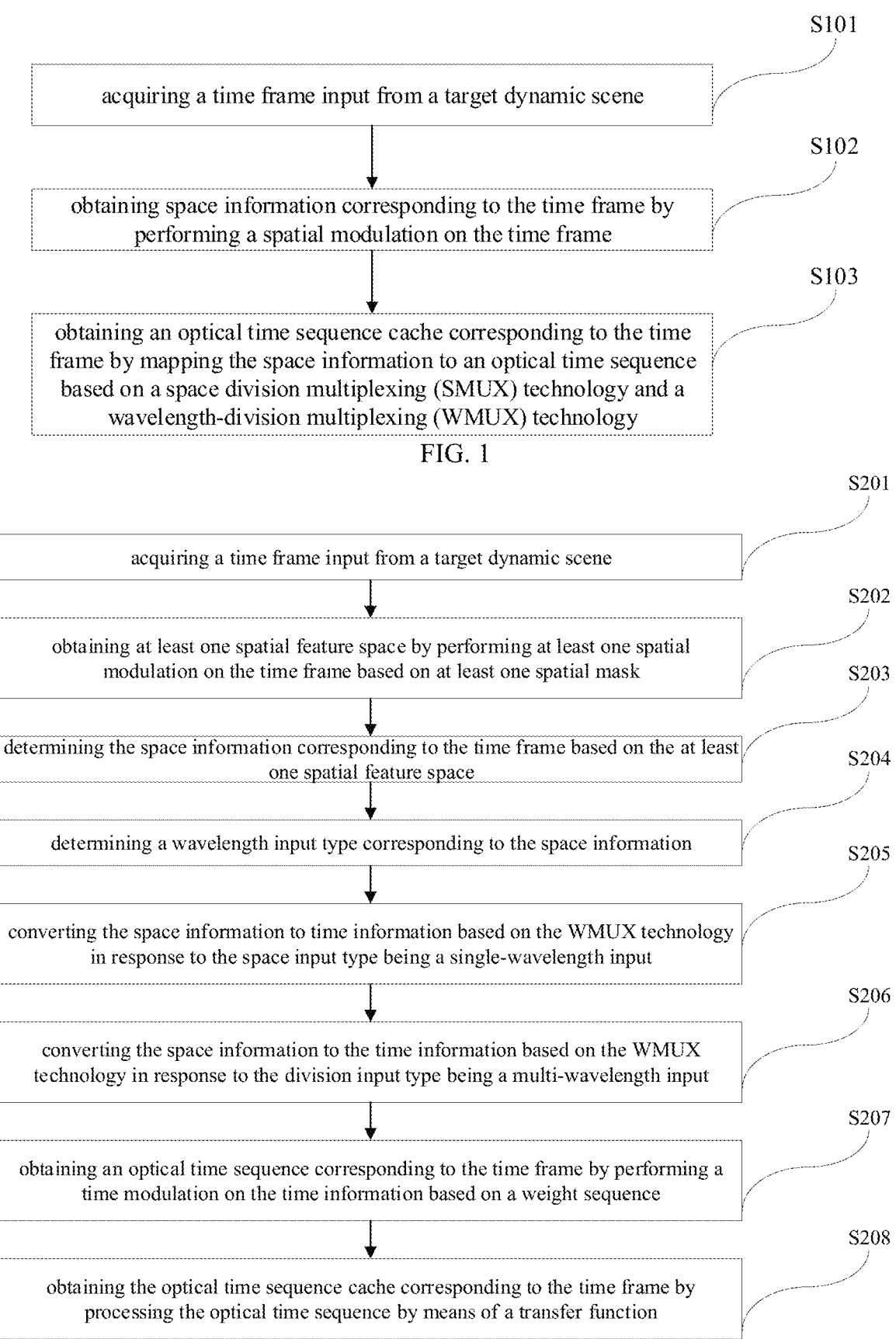

S101 acquiring a time frame input from a target dynamic scene

S102 obtaining space information corresponding to the time frame by performing a spatial modulation on the time frame

S103 obtaining an optical time sequence cache corresponding to the time frame by mapping the space information to an optical time sequence based on a space division multiplexing (SMUX) technology and a wavelength-division multiplexing (WMUX) technology

FIG. 1

S201 acquiring a time frame input from a target dynamic scene

S202 obtaining at least one spatial feature space by performing at least one spatial modulation on the time frame based on at least one spatial mask

S203 determining the space information corresponding to the time frame based on the at least one spatial feature space

S204 determining a wavelength input type corresponding to the space information

S205 converting the space information to time information based on the WMUX technology in response to the space input type being a single-wavelength input

S206 converting the space information to the time information based on the WMUX technology in response to the division input type being a multi-wavelength input

S207 obtaining an optical time sequence corresponding to the time frame by performing a time modulation on the time information based on a weight sequence

S208 obtaining the optical time sequence cache corresponding to the time frame by processing the optical time sequence by means of a transfer function

FIG. 2

S301 obtaining at least one optical time sequence cache corresponding to at least one time frame respectively by successively acquiring the at least one time frame input from the target dynamic scene based on a time sequence

S302 obtaining an optical time sequence cache of a dynamic optical field corresponding to the at least one time frame by successively combining the at least one optical time sequence cache based on the time sequence

S303 obtaining an activated optical time sequence cache of the dynamic optical field by performing an optical nonlinear activation on the optical time sequence cache of the dynamic optical field

S304 obtaining space information of the dynamic optical field corresponding to the activated optical time sequence cache of the dynamic optical field by demultiplexing the activated optical time sequence cache of the dynamic optical field

S305 determining feature information of the dynamic optical field corresponding to the at least one time frame based on the space information of the dynamic optical field

FIG. 5

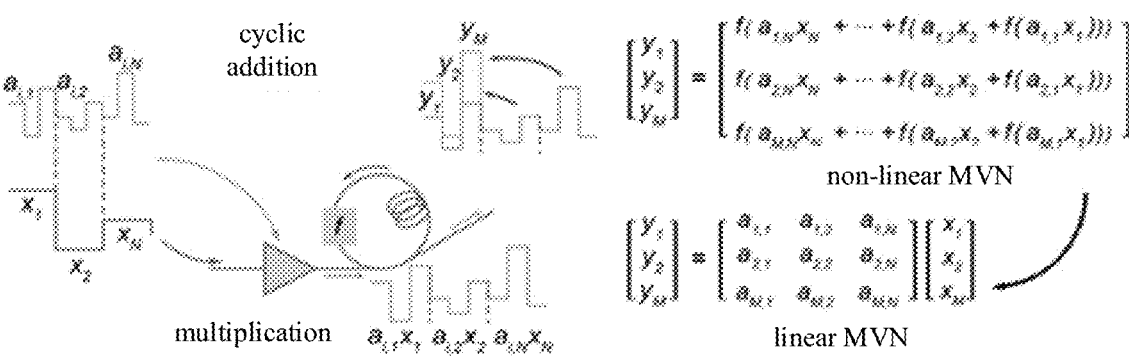

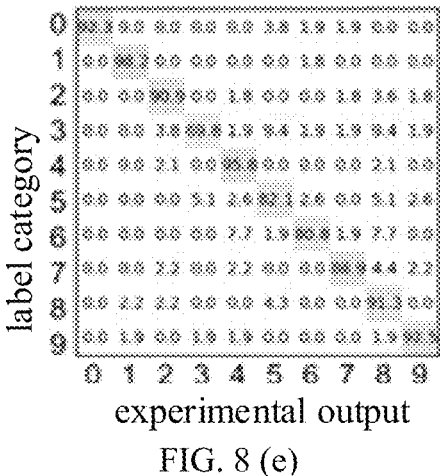
experimental output
FIG. 8 (e)
experimental output
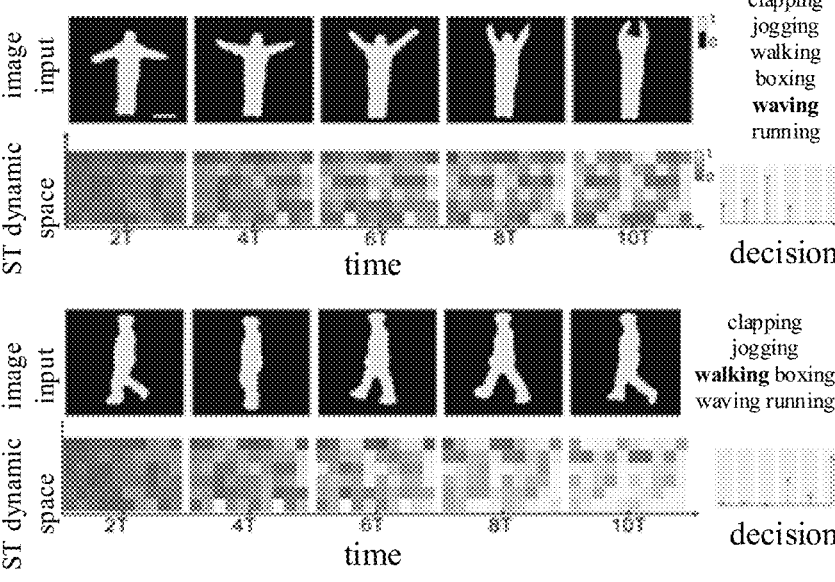
FIG. 8 (f)
FIG. 8 (g)

METHOD AND SYSTEM OF DYNAMIC OPTICAL INTELLIGENT COMPUTING

CROSS-REFERENCE TO RELATED APPLICATION

This application claims priority to Chinese Patent Application No. 202310000855.3, filed on Jan. 3, 2023, the entire disclosure of which is incorporated herein by reference.

TECHNICAL FIELD

The present disclosure relates to a field of computer technologies, and particularly to a method and a system of dynamic optical intelligent computing.

BACKGROUND

With development of science and technology, ultra-high-speed optical domain processing of dynamic optical fields will provide an unprecedented prospect for high-performance computing in the post Moore era and real-time analysis and control on a transient phenomenon. However, due to a limited degree of freedom of a computing module, existing optical computing may only process a single image, requiring frequently reading and writing of a digital memory to achieve dynamic optical field processing, which severely limits a speed of visual computing.

SUMMARY

A method of dynamic optical intelligent computing and a system are provided in the present disclosure.

According to an aspect of the present disclosure, a method of dynamic optical intelligent computing is provided, and includes:

acquiring a time frame input from a target dynamic scene;

obtaining space information corresponding to the time frame by performing a spatial modulation on the time frame; and obtaining an optical time sequence cache corresponding to the time frame by mapping the space information to an optical time sequence based on a space division multiplexing (SMUX) technology and a wavelength division multiplexing (WMUX) technology.

According to another aspect of the present disclosure, a system of dynamic optical intelligent computing is provided, and includes:

at least one processor; and a memory communicatively connected to the at least one processor and stored with instructions executable by the at least one processor, in which, when the instructions are performed by the at least one processor, the at least one processor is caused to perform:

acquiring a time frame input from a target dynamic scene;

obtaining space information corresponding to the time frame by performing a spatial modulation on the time frame; and obtaining an optical time sequence cache corresponding to the time frame by mapping the space information to an optical time sequence based on a space division multiplexing (SMUX) technology and a wavelength division multiplexing (WMUX) technology.

According to another aspect of the present disclosure, anon-transitory computer-readable storage medium storing computer instructions is provided, in which the computer instructions are configured to cause a computer to perform:

acquiring a time frame input from a target dynamic scene;

obtaining space information corresponding to the time frame by performing a spatial modulation on the time frame; and obtaining an optical time sequence cache corresponding to the time frame by mapping the space information to an optical time sequence based on a space division multiplexing (SMUX) technology and a wavelength division multiplexing (WMUX) technology.

It should be understood that, the content described in the part is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

FIG. 1 is a flowchart illustrating a method of dynamic optical intelligent computing according to a first embodiment of the present disclosure.

FIG. 2 is a flowchart illustrating a method of dynamic optical intelligent computing according to a second embodiment of the present disclosure.

FIG. 5 is a flowchart illustrating a method of dynamic optical intelligent computing according to a third embodiment of the present disclosure.

FIG. 6 (a) is a schematic diagram illustrating a computing structure of a spatiotemporal optical computing method according to an embodiment of the present disclosure.

FIG. 6 (b) is a schematic diagram illustrating a computing structure of an MVM mathematical model according to an embodiment of the present disclosure.

FIG. 8 (b) is a schematic diagram illustrating a structure of an SMUX-STPC network according to an embodiment of the present disclosure.

FIG. 8 (c) is a schematic diagram illustrating results before and after learning an SMUX-STPC network according to an embodiment of the present disclosure.

FIG. 8 (d) is a schematic diagram illustrating an evolution of a time sequence of an SMUX-STPC network according to an embodiment of the present disclosure.

FIG. 8 (e) is a schematic diagram illustrating a confusion matrix of an SMUX-STPC network according to an embodiment of the present disclosure.

FIG. 8 (f) is a schematic diagram illustrating a recognition performance of an SMUX-STPC network according to an embodiment of the present disclosure.

FIG. 8 (g) is a schematic diagram illustrating human action recognition of an SMUX-STPC network according to an embodiment of the present disclosure.

FIG. 9 (*b*) is a schematic diagram illustrating a fully-connected structure of a WMUX-STPC network according to an embodiment of the present disclosure.

FIG. 9 (*c*) is a schematic diagram illustrating a modulation of a WMUX-STPC network according to an embodiment of the present disclosure.

FIG. 9 (*d*) is a schematic diagram illustrating a modulation result of a WMUX-STPC network according to an embodiment of the present disclosure.

FIG. 9 (*e*) is a schematic diagram illustrating a data set of a WMUX-STPC network according to an embodiment of the present disclosure.

FIG. 9 (*f*) is a schematic diagram illustrating an output of a WMUX-STPC network according to an embodiment of the present disclosure.

FIG. 9 (*g*) is a schematic diagram illustrating nonlinear activation of a WMUX-STPC network according to an embodiment of the present disclosure.

FIG. 9 (*h*) is a schematic diagram illustrating a result of a WMUX-STPC network according to an embodiment of the present disclosure.

FIG. 9 (*i*) is a schematic diagram illustrating dynamic monitoring of a WMUX-STPC network according to an embodiment of the present disclosure.

DETAILED DESCRIPTION

Figure 3:
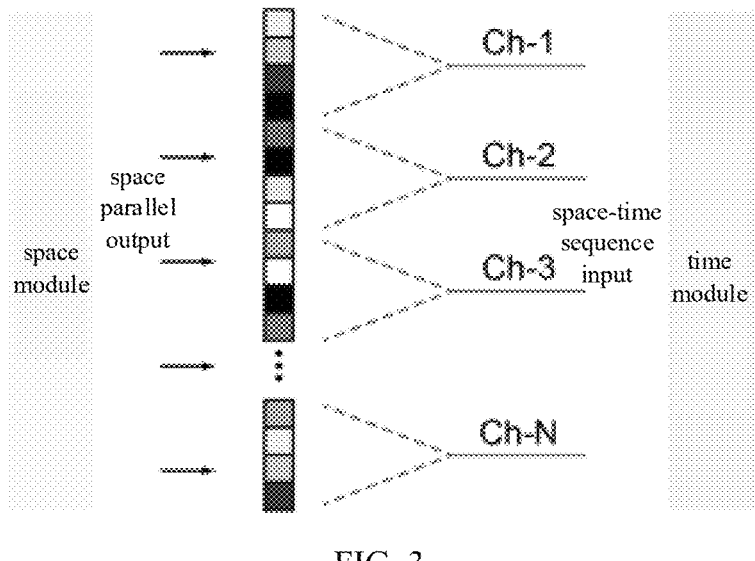
FIG. 3 is a schematic diagram illustrating a principle of a space division multiplexing (SMUX) technology according to an embodiment of the present disclosure.

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

High speed processing of a dynamic optical field has proven to be of great significance to machine vision and scientific discovery. Benefiting from the development of an artificial neural network, electro-visual computing has achieved an excellent performance in various applications. High speed dynamic vision computing, such as tracking, detection and recognition, becomes crucial in scenarios that change over time, such as, autonomous driving and an intelligent robot. Unfortunately, an integration density of a silicon transistor is gradually close to a physical limit, so that a computing speed of an electronic computer tends to be saturated. In another aspect, research on an ultrafast optical field is crucial to scientific research, and repeat detection and continuous imaging technologies may support recording a transient process as low as a nanosecond level and a picosecond level. However, reconstruction and analysis of an ultrafast visual dynamic require digital transmission and processing by an electronic computer, and a dependence on electronic post-processing hinders real-time analysis and feedback control on ultrafast phenomena.

Unlike only relying on the electronic computer, optical computing may mitigate a bottleneck of electrical computing and accelerate optical field processing by low loss and ultrafast optical propagation. A high speed linear multiplication performed by means of a coherent optical integrated circuit, an on-chip resonator, a diffractive optical processor, a photonic phase change material and a waveguide dispersion may verify advantages of photon computing. The result suggests that light may be applied to various kinds of computing, including nonlinear neuronal activation, NP-hard optimization, equation solving, integration and differentiation. Based on linear and nonlinear optical computing paradigms, an optical neural network may perform machine vision tasks, such as edge detection, image classification, saliency detection and human action recognition.

However, although advances have been made in optical computing, the most advanced optical computing method does not have an ability to process an ultrafast dynamic optical field. At present, in order to process a spatiotemporal optical field, dynamic inputs are generally sequentially calculated in a spatial domain, and outputs at different times may be transmitted, stored and further processed by means of a digital electrical technology. Although this method takes advantage of high space parallelism of optical propagation, digital transmission and a read/write operation of a memory severely limit a reasoning speed, which suppress advantages of optics in high speed computing.

On a most advanced electronic computer, the read/write operation of the memory is related to a delay of more than one hundred nanoseconds, while sequential data in a neural network structure requires frequent read/write, resulting in a nanosecond dynamic event unable to be processed in real time, thereby suppressing an ultra-high speed application of an artificial neural network. Dependence on memory also stifles an existing optical computing technology from utilizing all potentials of light.

It has been proven that operations in space and time for an optical field may overcome a limitation on a degree of freedom with only spatial modulation. Therefore, an optical computing system considering both space and time makes it possible to eliminate a bottleneck of digital computing, and has the potential to process the ultrafast optical field. Although a system for computing a sequence in time for nonlinear preprocessing has been applied in vowel recognition, sequence data classification, time sequence prediction, and other aspects, these solutions are mainly for one-dimensional data, and a limitation of a calculation scale makes it unable to effectively process a high-dimensional optical field. There is still a lack of an optical computing solution considering both high speed and spatial and temporal features of the optical field, which limits rapid implementation of an advanced machine vision architecture and real-time analysis of an ultra-high speed dynamic. In the related art, calculation and conversion between a highly parallelized spatial optical field and a high speed changing temporal optical field are still challenging due to a mismatch between an inherent size of the spatial optical field and an inherent size of the temporal optical field. A lack of a technology that bridges a mismatch in dimension between the spatial optical field and the temporal optical field and a lack of a general analyzable spatiotemporal optical computing model suppress development of ultra-high-speed spatiotemporal optical computing.

The present disclosure is described below in combination with a specific embodiment.

In a first embodiment, as illustrated in FIG. 1, FIG. 1 is a flowchart illustrating a method of dynamic optical intelligent computing according to a first embodiment of the present disclosure. The method may be implemented relying on a computer program, and may be run on an apparatus for performing the method of dynamic optical intelligent computing. The computer program may be integrated in an application, or may be run as an independent tool application.

The apparatus of dynamic optical intelligent computing may be a terminal with a dynamic optical intelligent computing function. The terminal includes but is not limited to a wearable device, a handheld device, a personal computer, a tablet computer, a vehicle-mounted device, a smartphone, a computing device or other processing device connected to a wireless modem. The terminals in different networks may be called as different names, for example, a user equipment, an access terminal, a user unit, a user station, a mobile station, a remote station, a remote terminal, a mobile device, a user terminal, a terminal, a wireless communication device, a user agent or a user device, a cellular phone, a cordless telephone, a personal digital assistant (PDA), a 5th generation (5G) mobile communication technology network, a 4th generation (4G) mobile communication technology network, a 3rd-generation (3G) mobile communication technology network or a terminal in a future evolution network.

In an embodiment, the method of dynamic optical intelligent computing includes the following blocks.

At block S101, a time frame input from a target dynamic scene is acquired.

As an example, the target dynamic scene may refer to a scene where dynamic optical intelligent computing is to be performed. The target dynamic scene is not limited to a certain fixed scene. The target dynamic scene may be, for example, a high-dimensional dynamic optical field.

When a terminal performs the dynamic optical intelligent computing, a time-varying optical field in milliseconds to nanoseconds from the target dynamic scene may be input into a network through optical free propagation, so that the terminal may obtain the time frame input from the target dynamic scene.

At block S102, space information corresponding to the time frame is obtained by performing a spatial modulation on the time frame.

As an example, the spatial modulation may refer to a process in which a phase and/or an amplitude of a spatial optical field corresponding to the time frame is modulated by rapidly changing spatial masks or a static spatial mask.

Diversity of modes of the optical field decreases sharply when transitioning to a time signal from a space signal. Directly coupling space content to a single mode time channel may result in a loss of most information.

When the time frame input from the target dynamic scene is acquired, the space information corresponding to the time frame may be obtained by performing the spatial modulation on the time frame.

At block S103, an optical time sequence cache corresponding to the time frame is obtained by mapping the space information to an optical time sequence based on a space division multiplexing (SMUX) technology and a wavelength division multiplexing (WMUX) technology.

As an example, the space division multiplexing (SMUX) technology may refer to a technology that a high-resolution output from a space computing module is divided into subdivisions, and lights corresponding to the subdivisions are coupled to a plurality of independent time channels respectively.

The wavelength division multiplexing (WMUX) technology may refer to a technology that spatial light is encoded with different wavelengths, and broadband multi-wavelength optical signals are transmitted to a same channel for high speed computing.

When the space information corresponding to the time frame is obtained, information capacity may be added based on the SMUX technology and the WMUX technology, bridging between a highly parallel space dimension and a high speed time dimension, and the space information may be mapped to the optical time sequence to obtain the optical time sequence cache corresponding to the time frame.

In summary, according to the method provided in the embodiment of the present disclosure, the time frame input from the target dynamic scene is acquired; the space information corresponding to the time frame is obtained by performing the spatial modulation on the time frame; and the optical time sequence cache corresponding to the time frame is obtained by mapping the space information to the optical time sequence based on the SMUX technology and the WMUX technology. Therefore, the SMUX technology and the WMUX technology may cause matching of a highly parallel space output and a high speed time input, and fully retaining content information. The space content may be processed and mapped to a parallel dynamic time sequence to form a spatiotemporal feature space compatible with time computing, and a dimension of optical vision computing may be expanded from a 2D space image to a 3D spatiotemporal optical field, which may effectively calculate and convert between a spatial optical field and a temporal optical field. At the same time, fast-changing optical signals are stored and combined by means of the optical time sequence cache, so that features may be delayed and reproduced in an optical domain.

As illustrated in FIG. 2, FIG. 2 is a flowchart illustrating a method of dynamic optical intelligent computing according to a second embodiment of the present disclosure. The method may be performed by a terminal. Specifically, the method of dynamic optical intelligent computing includes the following blocks.

At block S201, a time frame input from a target dynamic scene is acquired.

As an example, when the terminal performs dynamic optical intelligent computing, the time frame input from the target dynamic scene may be acquired through a spatiotemporal (ST) computing unit.

The ST computing unit may include a space computing module and a time computing module. The space computing module and the time computing module may be connected through the SMUX technology or the WMUX technology. More specifically, a space output is connected to a time input. Through a combination of space and time operations, a dynamic optical field is continuously processed in a spatiotemporal optical domain at an optical speed, and the ST computing unit may fully extract information from a high-dimensional dynamic optical field and infer semantic information from a scene content.

It is easy to be understood that, when the dynamic all-optical intelligent sensing-computing is performed, the time frame input from the target dynamic scene may be acquired through the ST computing unit.

At block S202, at least one spatial feature space is obtained by performing at least one spatial modulation on the time frame based on at least one spatial mask.

For example, the space computing module in the ST computing unit may perform a spatial modulation on the time frame. At this time, since optical propagation has high parallelism in free space, a large number of computation operations are operated in a space computing module at an optical speed, and space information is fully extracted from each time slice.

For example, N fast-changing spatial masks may achieve expansion by N times in a channel depth of a single time frame image, thus expanding the spatial feature space at a time dimension. For example, spatial feature spaces $C_{1,1}, \ldots, C_{1,N}$ corresponding to a time frame I1 may be obtained, where N is a positive integer.

At block S203, space information corresponding to the time frame is determined based on the at least one spatial feature space.

For example, when the at least one spatial feature spaces $C_{1,1}, \ldots, C_{1,N}$ is obtained, space information $(C_{1,1}, \ldots, C_{1,N})$ corresponding to the time frame I1 may be determined based on the at least one spatial feature spaces $C_{1,1}, \ldots, C_{1,N}$.

At block S204, a wavelength input type corresponding to the space information is determined.

As an example, the wavelength input type may refer to a wavelength type corresponding to the time frame. The time frame may be referred to as a time frame image. The wavelength input type may include but is not limited to a single-wavelength input and a multi-wavelength input.

When the space information corresponding to the time frame is determined, the wavelength input type corresponding to the space information may be determined.

At block S205, the space information is converted to time information based on the WMUX technology in response to the wavelength input type being a single-wavelength input.

As an example, FIG. 3 is a diagram illustrating a principle of a space division multiplexing (SMUX) technology according to an embodiment of the present disclosure. As illustrated in FIG. 3, when the time information corresponding to space information is determined based on the SMUX technology, each of the at least one spatial feature space is divided into at least one spatial feature subspace, and each of at least one piece of time feature information corresponding to each of the at least one spatial feature space may be obtained by modulating the at least one spatial feature subspace of each spatial feature space by means of a high speed spatial modulator. The time information corresponding to the space information is determined based on the at least one piece of time feature information corresponding to the at least one spatial feature space.

In some examples, the time information may include at least one piece of time feature information. The at least one piece of time feature information correspond one to one with the at least one spatial feature space. Each time feature information may include at least one time channel. The at least one time channel corresponds one to one with the least one spatial feature subspace.

In some examples, when each spatial feature space is divided into at least one spatial feature subspace, the at least one spatial feature subspace in each spatial feature space shares one time channel.

In some examples, a high speed spatial modulator, i.e., spatial optical modulator, has millions of modulation pixels capable of processing dynamic inputs with high spatial resolution. The input space information is modulated by the high speed spatial modulator. A signal is compressed in a spatial domain and expanded in a time domain.

At block S206, the space information is converted to the time information based on the WMUX technology in response to the wavelength input type being a multi-wavelength input.

Figure 4:
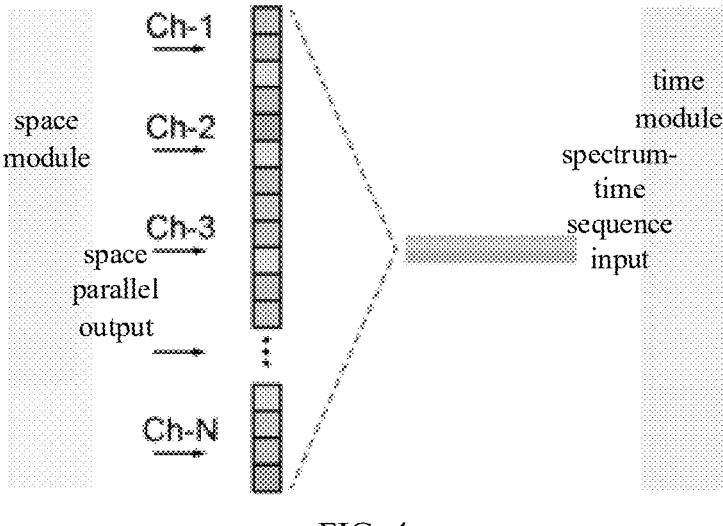
FIG. 4 is a schematic diagram illustrating a principle of a wavelength division multiplexing (WMUX) technology according to an embodiment of the present disclosure.

As an example, FIG. 4 is a diagram illustrating a principle of a wavelength division multiplexing (WMUX) technology according to an embodiment of the present disclosure. As illustrated in FIG. 4, the at least one spatial feature space is encoded with at least one wavelength respectively, and the at least one spatial feature space is encoded with at least one spectrum respectively by means of the WMUX. The time information corresponding to the space information is encoded based on the at least one spectrum.

In some examples, at least one piece of time feature information corresponds one to one with the at least one spectrum.

In some examples, the spatial feature space in the space information may be encoded with different wavelengths based on the WMUX technology, and multiplexed in a single time channel. All space information may be saved on the spectrum through the WMUX without additional high speed spatial modulation, thereby supporting processing of an ultra-high-speed dynamic.

When the space information $(C_{1,1}, \ldots, C_{1,N})$ corresponding to the time frame is determined, time information $(a_{i1}, a_{i2}, \ldots, a_{iN})$ corresponding to the space information $(C_{1,1}, \ldots, C_{1,N})$ may be determined based on the SMUX technology or the WMUX technology according to the wavelength input type corresponding to the space information, where i is a positive integer, and $1 \leq i \leq M$, M is a number of time channels.

At block S207, an optical time sequence corresponding to the time frame is obtained by performing a time modulation on the time information based on a weight sequence.

As an example, the weight sequence may include at least one weight value. The at least one weight value corresponds one to one with the at least one piece of time feature information.

In some examples, the optical time sequence corresponding to the time frame may be obtained by multiplying the at least one weight value by the at least one piece of time feature information respectively by means of a matrix-vector multiplication (MVM) mathematical model.

For example, when the time information $(a_{i1}, a_{i2}, \ldots, a_{iN})$ corresponding to the space information $(C_{1,1}, \ldots, C_{1,N})$ is obtained, an optical time sequence $(x_1 a_{i1}, x_2 a_{i2}, \ldots x_N a_{iN})$ corresponding to the time frame is obtained by performing the time modulation on the time information $(a_{i1}, a_{i2}, \ldots, a_{iN})$ based on a weight sequence $(x_1, x_2, \ldots, x_N)$.

In some examples, the matrix-vector multiplication mathematical model may be a matrix-vector multiplier, and may perform a weighted sum operation in the optical field. And complex computations in spatiotemporal dimensions may be achieved by combining the space computing module and the time computing module.

At block S208, an optical time sequence cache corresponding to the time frame is obtained by processing the optical time sequence by means of a transfer function.

As an example, a mathematical form of a transfer function $f(\cdot)$ depends on a setup of the optical time sequence cache. When the optical time sequence cache include a non-linear element, for example, an optical-electric-optical (OEO) converter formed by a photodiode and an intensity modulator, the transfer function $f(\cdot)$ has a non-linear characteristic which may be set by adjusting a bias of the intensity modulator. When the intensity modulator is biased at its minimum output (NULL point), the transfer function $f(\cdot)$ takes a form of a sinusoidal function, that is, $f(x)=a \cdot \sin (b \cdot x)^2$, where a and b are system parameters and depend on an input power and a loop gain coefficient. When the cache only includes passive or linear optical elements, the transfer

9 function $f(\cdot)$ is a linear function, and a transmission process is equivalent to a linear matrix-vector multiplication.

When the optical time sequence $(x_1a_{i1}, x_2a_{i2}, \ldots x_Na_{iN})$ corresponding to the time frame is obtained, the optical time sequence $(x_1a_{i1}, x_2a_{i2}, \ldots x_Na_{iN})$ may be injected into the optical time sequence cache to obtain an initial optical time sequence cache. Next, the initial optical time sequence cache may be acted by the transfer function $f(\cdot)$ to obtain the optical time sequence cache corresponding to the time frame.

In summary, according to the method provided in the embodiment of the present disclosure, the time frame input from the target dynamic scene is acquired; the at least one spatial feature space is obtained by performing the at least one spatial modulation on the time frame based on the at least one spatial mask; the space information corresponding to the time frame is determined based on the at least one spatial feature space; the wavelength input type corresponding to the space information is determined; the space information is converted to the time information based on the WMUX technology in response to the wavelength input type being the single-wavelength input; the space information is converted to the time information based on the WMUX technology in response to the wavelength input type being the multi-wavelength input; the optical time sequence corresponding to the time frame is obtained by performing the time modulation on the time information based on the weight sequence; and the optical time sequence cache corresponding to the time frame is obtained by processing the optical time sequence by means of the transfer function. Therefore, the SMUX technology and the WMUX technology may cause matching of a highly parallel space output and a high speed time input, and fully retaining content information. The space content may be processed and mapped to a parallel dynamic time sequence to form a spatiotemporal feature space compatible with time computing, and a dimension of optical vision computing may be expanded from a 2D space image to a 3D spatiotemporal optical field, which may effectively calculate and convert between a spatial optical field and a temporal optical field. At the same time, fast-changing optical signals are stored and combined by means of the optical time sequence cache, so that features may be delayed and reproduced in an optical domain.

As illustrated in FIG. 5, FIG. 5 is a flowchart illustrating a method of dynamic optical intelligent computing according to a third embodiment of the present disclosure. The method may be performed by a terminal. Specifically, the method of dynamic optical intelligent computing includes the following blocks.

At block S301 at least one time frame input from a target dynamic scene is acquired based on a time sequence, and at least one optical time sequence cache corresponding to the at least one time frame is obtained.

As an example, in a time computing module, storage and connection are implemented by constructing an optical time sequence cache with waveguide extension and cycle, and the optical time sequence cache may provide a time cache from picoseconds to milliseconds.

In some examples, when light is cycled once in the time sequence cache based on the time sequence, an initial optical time sequence cache corresponding to one time frame may be obtained, and the initial optical time sequence cache may be acted by a transfer function $f(\cdot)$.

At block S302, an optical time sequence cache of a dynamic optical field corresponding to the at least one time frame is obtained by combining the at least one optical time sequence cache based on the time sequence.

As an example, when the at least one optical time sequence cache is successively combined based on the time sequence, a spatiotemporal modulation and cache combination are combined and a full connection is performed on a spatiotemporal sequence. Repeat until the end of dynamic inputs to obtain the optical time sequence cache of the dynamic optical field corresponding to the at least one time frame.

In some examples, FIG. 6 (a) is a diagram illustrating a computing structure of a spatiotemporal optical computing method according to an embodiment of the present disclosure. As illustrated in FIG. 6 (a), an input spatiotemporal optical field is modeled as a 3-dimensional time stack, that is, stacked by a series of image (time) frames (3 frames in FIG. 6 (a), $I_1$, $I_2$, $I_3$) on a time dimension, and time is a channel dimension. Within each time period, the space computing module performs space computing by performing N spatial modulations on each space image, and the space computing may be a weighted connection or a point-by-point multiplication. Therefore, a feature space on the time dimension is enlarged by N times. A space output is multiplexed into the time computing module through the SMUX or the WMUX. In a time computing module, a time sequence multiplication (modulation) is performed on an input temporal optical field based on a weight $w_i$, to generated $S_{1,1}, \ldots, S_{1,N}, S_{2,1}, \ldots, S_{2,N}, S_{3,1}, \ldots, S_{3,N}$, and channel features are summed (combined) in the optical time sequence cache, which substantially performs a full connection across time (channel) dimensions and finally generates an output optical field $(O_1, O_2, O_3)$. Therefore, with a combination of the space computing and the time computing, the proposed method of spatiotemporal optical computing may effectively calculate on lateral (space) and longitudinal (time) dimensions of the optical field.

In some examples, FIG. 6 (b) is a diagram illustrating a computing structure of an MVM mathematical model according to an embodiment of the present disclosure. As illustrated in FIG. 6 (b), each multiplier in a vertex is multiplied by a series of multipliers at a time domain modulator. Then, multiplied signals are cycled and repeatedly accumulated in the optical time sequence cache. The function $f(\cdot)$ represents a transmission feature of the optical time sequence cache, which depends on an implementation of a loop. Cycle is passive or linear, and a non-linear MVM may be degraded to a linear MVM.

At block S303, an activated optical time sequence cache of the dynamic optical field is obtained by performing an optical nonlinear activation on the optical time sequence cache of the dynamic optical field.

As an example, before the optical non-linear activation is performed on the activated optical time sequence cache of the dynamic optical field, a multivariable nonlinear neuron activation function may be constructed by combining a self-gain modulation effect with a cross-gain modulation effect. The specific equation is as follows:

$$o_{\lambda_i} = g(z_{\lambda_1}, \ldots z_{\lambda_N})$$

where, $z_{\lambda_i}$ is an input power of a wavelength $\lambda_i$, and $o_{\lambda_i}$ is an output power of a wavelength $\lambda_i$.

At block S304, space information of the dynamic optical field corresponding to the activated optical time sequence cache of the dynamic optical field is obtained by demultiplexing the activated optical time sequence cache of the dynamic optical field.

When the activated optical time sequence cache of the dynamic optical field is obtained, the space information of the dynamic optical field corresponding to the activated optical time sequence cache of the dynamic optical field may be obtained by demultiplexing the activated optical time sequence cache of the dynamic optical field.

At block S305, feature information of the dynamic optical field corresponding to the at least one time frame is determined based on the space information of the dynamic optical field.

Figure 7:
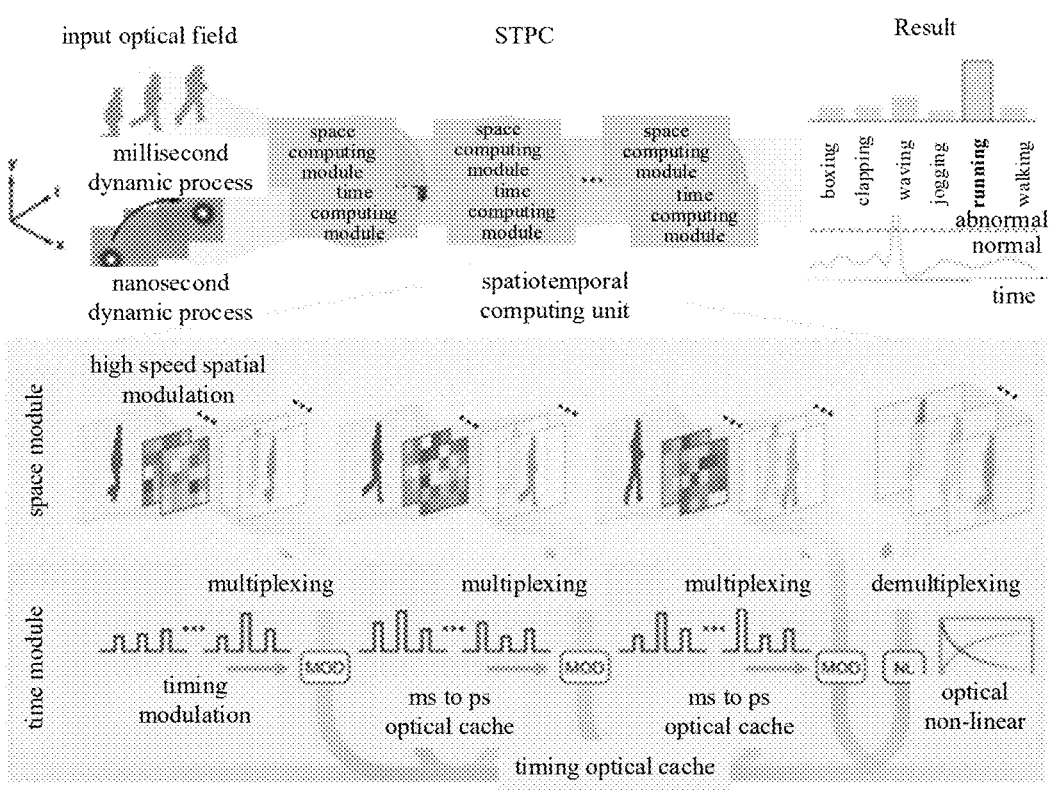
FIG. 7 is a schematic diagram illustrating an architecture of a spatiotemporal optical computing method according to an embodiment of the present disclosure.

As an example, FIG. 7 is a diagram illustrating an architecture of a spatiotemporal optical computing method according to an embodiment of the present disclosure. As illustrated in FIG. 7, a spatiotemporal optical computing architecture (STPC) is formed by a cascade of ST computing units. A dynamic scene encoded on the spatiotemporal optical field enters the STPC, a time sequence signal is weighted by a time modulation, and instant computing results from spatial and time modulations are stored and combined into a time sequence cache until the end of dynamic inputs. Then, an output from the ST computing unit is non-linearly activated by light, demultiplexed from the cache, and sent to a subsequent ST computing unit for subsequent computing, and a last ST computing unit performs a final decision. Finally, features of the optical field may be inferred, including an action type and a flicker mode.

In some examples, the STPC may process the dynamic optical field without a read/write delay of a memory. Therefore, real-time analysis of high speed machine vision and an ultrafast dynamic process may be achieved, which may lay a foundation for ultra-high-speed advanced optical machine vision, and may pave a way for an unmanned system, an intelligent robot, autonomous driving and ultra-high-speed scientific calculation.

In summary, according to the method provided in the embodiment of the present disclosure, the at least one optical time sequence cache corresponding to the at least one time frame is obtained by successively acquiring the at least one time frame input from the target dynamic scene based on the time sequence; the optical time sequence cache of the dynamic optical field corresponding to the at least one time frame is obtained by successively combining the at least one optical time sequence cache based on the time sequence, the activated optical time sequence cache of the optical time sequence cache of the dynamic optical field is obtained by performing the optical nonlinear activation on the optical time sequence cache of the dynamic optical field; the space information of the dynamic optical field corresponding to the activated optical time sequence cache of the dynamic optical field is obtained by demultiplexing the optical time sequence cache of the dynamic optical field; and the feature information of the dynamic optical field corresponding to the at least one time frame is determined based on the space information of the dynamic optical field. Therefore, the SMUX technology and the WMUX technology may cause matching of a highly parallel space output and a high speed time input, and fully retaining content information. The space content may be processed and mapped to a parallel dynamic time sequence to form a spatiotemporal feature space compatible with time computing, and a dimension of optical vision computing may be expanded from a 2D space image to a 3D spatiotemporal optical field, which may effectively calculate and convert between a spatial optical field and a temporal optical field. At the same time, fast-changing optical signals are stored and combined by means of the optical time sequence cache, so that features may be delayed and reproduced in an optical domain.

Taking a scene for an example, an SMUX-STPC network for high speed dynamic scene analysis is further provided in the present disclosure.

Figure 8:
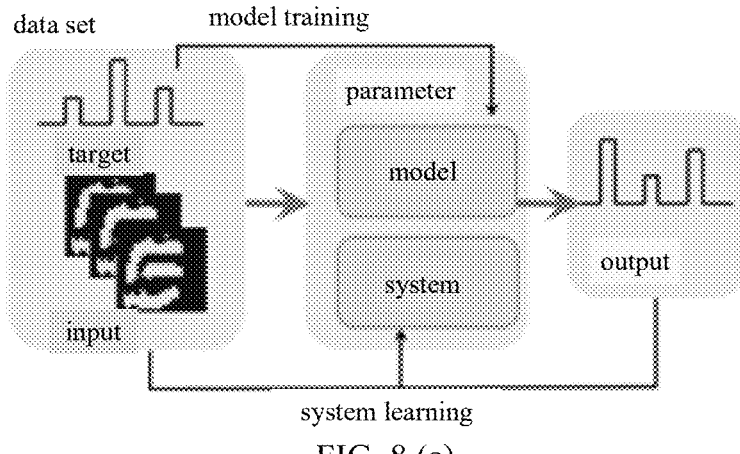
FIG. 8 (a) is a schematic diagram illustrating a system of an SMUX-STPC network according to an embodiment of the present disclosure.
Figure 8:
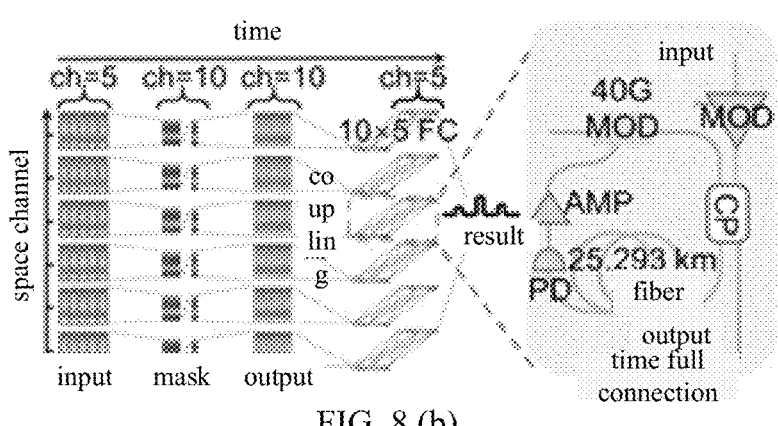
Figure 8:
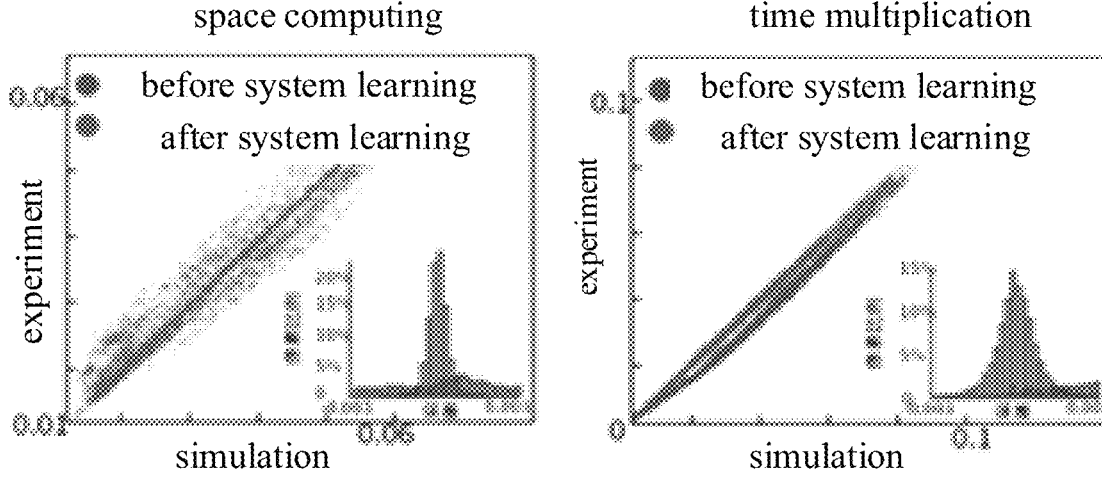
Figure 8:
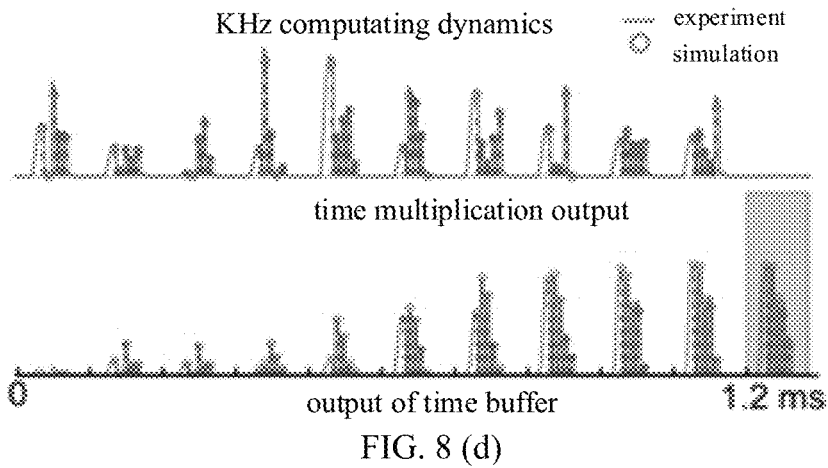

FIG. 8 (a) is a diagram illustrating a system of an SMUX-STPC network according to an embodiment of the present disclosure. As illustrated in FIG. 8 (a), a learning process of a STPC physical experiment may include model training and system learning. The entire system includes three parts: a data set with pairs of input and target, an experimental system, and an experimental output. The experimental system includes model parameters and system parameters. The model parameters may include weights of the STPC, which mainly relate to a mask of the space computing and a weight of the time modulation, and may be learned by training the pairs of input and target. The system parameters may represent a transfer function of a physical experimental system of space and time computing modules, and may be initially calibrated with a random input. Given training pairs of input and target, the system may be pretrained with calibrated system parameters until converged. Since there are a bias and noise in calibration data, an experimental result may have an offset from a simulation result. A system learning process may be designed to finely train the system parameters, at which time the model parameter is fixed, and the system parameters are updated to adapt to the experimental output with a higher precision. When the system learning process is completed, the system may better correspond to numerical prediction, and a final training and an experiment of the model parameter may be performed based on the refined system parameter. The system parameters representing the transfer function of the physical system may be learned by the experimental input and the experimental output, which may improve an accuracy of system modeling.

FIG. 8 (b) is a diagram illustrating a structure of an SMUX-STPC network in an embodiment of the present disclosure. As illustrated in FIG. 8 (b), an SMUX-STPC network including six spatial multiplexing divisions is used to recognize a high speed video dynamic. Computing in space and time are performed on each division to achieve a final result. More specifically, in each division, each frame of five frames of inputs is modulated by two spatial masks on a digital micromirror device (DMD), and a working frame rate is 8,024 fps. By summarizing ten frames generated by an output of each space computing module, a stacking dimension (6, 10) including spatiotemporal information may be obtained. Then, six space computing modules may be coupled into time channels. In a spatiotemporal computing module, a semiconductor optical amplifier (SOA) performs a spatiotemporal multiplication by modulating an injected current. An optoelectronic circuit consists of a fiber cache, a low noise amplifier (LNA) and an intensity modulator (MOD), and is mainly used for buffer and relay inputs. A (6, 10) spatiotemporal output from a space computing module is calculated based on a 10×5 spatiotemporal linear connection in a general spatiotemporal matrix-vector multiplication unit, to form a spatiotemporal stack with a dimension of (6, 5), thereby finally obtaining a reasoning result.

It should be noted that, for the SMUX-STPC network, an experimental test may be performed on handwritten numeral classification tasks of a dynamic N-MNIST data set. The N-MNIST data set may include 10 types of handwritten numeral spatiotemporal spike events. Each sample is preprocessed into a series of five spike diagrams, and a pixel resolution of the DMD is 541×541. In order to calibrate the system parameter, features of the DMD, the SOA and the optical time sequence cache may be measured first, and a system simulation may be performed by means of transfer functions in a pre-training process.

FIG. 8 (c) is a diagram illustrating results before and after learning an SMUX-STPC network in an embodiment of the present disclosure. As illustrated in FIG. 8 (c), since distributions of a calibration input and a data set input are different, and a measurement noise exists in a calibration process, there is a significant difference between an experimental output of 64 training sequences randomly selected and a simulation result. Therefore, the 64 training sequences randomly selected from a training set may be further taken as a system learning subset, and a coupling matrix of the DMD and a system parameter of the SOA are finely adjusted based on input data and a measurement output. In system learning, the system parameter is updated by taking the experimental results as samples. Experimental measurement results may better correspond to expected results through system learning and additional training, and relative errors between space computing and time multiplication respectively decrease to 1.20%, 2.91% from 12.05%, 17.48%, with a decrease of 90.04% and 83.35%, respectively.

FIG. 8 (d) is a diagram illustrating an evolution of a time sequence of an SMUX-STPC network provided in an embodiment of the present disclosure. As illustrated in FIG. 8 (d), a circle represents a simulation result, and a line represents an experimental output, which illustrates an evolution of a time sequence in a cache of a time computing module with a kilohertz computing dynamic. A spatiotemporal multiplication output includes 10 coupled inputs, each of which is weighted five times through the SOA. In an output of a time buffer, an input light and a buffered light are combined with a fixed time step as a period, and then acted together by a transfer function. There are ten buffer and combining periods. A system output (marked by a shadow box) may be generated at an 11th cycle. Therefore, a spatiotemporal cache performs a 10×5 full connection at a frame rate of 8,024 fps, and may perform the space computing on a total (6,5)-dimensional spatiotemporal output, and an object is classified into one of ten numbers.

Before system learning, a network may be calibrated based on randomly input data, and an experimental precision is reduced to 53.03% compared with a simulation value, which is far below a training accuracy of 98.49%. After the system learning, 500 test sequences are randomly selected from a test set to evaluate an accuracy of a blind test. An overall experiment accuracy is 88.4%, which works well, compared with a simulation test accuracy of 92.1%. FIG. 8 (e) is a diagram illustrating a confusion matrix of an SMUX-STPC network provided in an embodiment of the present disclosure. As illustrated in FIG. 8 (e), more than half of categories have a classification accuracy of over 90%.

FIG. 8 (f) is a diagram illustrating a recognition performance of an SMUX-STPC network provided in an embodiment of the present disclosure. As illustrated in FIG. 8 (f), comparing a recognition performance of a single input with a recognition performance of a dynamic input, the dynamic input (including 5 frames) and the single input with a single frame are computed respectively with different numbers of masks of space computing in the STPC. An accuracy of simulation frame of the dynamic input with 10 masks (F5-M10) of the space computing is 85.32%. Although the single input is configured with a same number of parameters (F5-M10 and F1-M10) as the dynamic input, an F1-M10 architecture (with an accuracy of 73.98%) is slightly improved compared with a similar model (F1-M1, with an accuracy of 71.20%) with fewer parameters, which proves importance of a spatiotemporal optical computing architecture capable of processing a dynamic optical field. After the system learning, an accuracy of an experimental frame increases to 80.45% from 48.49%, which is close to a simulation accuracy of 86.81%.

In addition, a video accuracy of voting for all frames of a same video based on a winner-takes-all policy is also calculated. An accuracy of an experimental video of the STPC is 90.74% (49 of 54 test videos is successfully classified), which is same as a simulation video accuracy, while a frame rate is increased by 40 times compared with the most advanced result (20 sequences per second). Moreover, the STPC includes 40560 binary space weights, 300 12-bit time weights and 300 16-bit linear weights, a sum of which is weights of 6.20 kilobytes, so that a number of parameters is reduced by three orders of magnitude (more than one million 8-bit weights).

In order to further verify an ability of the SMUX-STPC to recognize a high speed dynamic motion, an experiment may be performed on a KTH human action video data set. The data set includes videos of six different actions performed by 25 participants: boxing, clapping, waving, jogging, running and walking. A video is further decomposed into sequences of training and test data sets and is sent to a constructed SMUX-STPC for recognition, each input sequence includes 5 frames. The STPC network determines a category of a sample based on content of the input with 5 frames. FIG. 8 (g) is a diagram illustrating human action recognition of an SMUX-STPC network provided in an embodiment of the present disclosure. Two inputs "waving" and "walking" and corresponding spatiotemporal dynamics are illustrated in FIG. 8 (g). For the two inputs with different categories, spatiotemporal outputs at a first time period is highly similar, indicating that diversity of a single frame image is limited, and human action recognition based on the single frame image is challenging. As more frames are sent to the system, unique features of different actions begin to be accumulated.

In summary, the SMUX-STPC network provided in embodiments of the present disclosure may process a daily visual scene at a frame rate exceeding kHz, and on the basis of a similar performance, a speed and a parameter efficiency are improved by more than 10 times compared with a related method. A parameterized physical system and a computing model are jointly optimized based on the method of system learning, causing a precision of spatiotemporal optical computing to be improved by more than 80%, and making it possible to quickly and accurately calculate an optical field with varying space and time. And, the proposed spatiotemporal optical computing architecture achieves an excellent performance on reference pulse image sequence classification and a human body action recognition task with an extremely high parameter efficiency, and has a speed improved by 40 times compared with the related method, exceeding an electronic computing processor, and causes a reasoning time to be reduced by more than one order of magnitude. The spatiotemporal optical field computing plays a crucial role in extracting comprehensive information of a high-dimensional optical feature space, without a digital burden of transmission and storage. Therefore, it has a potential to be used for high speed analysis of a complex visual scene.

Taking one scene for an example, a wavelength division multiplexing (WMUX) all-optical non-linear STPC network for nanosecond dynamic optical field recognition is further provided in the present disclosure.

Figure 9:
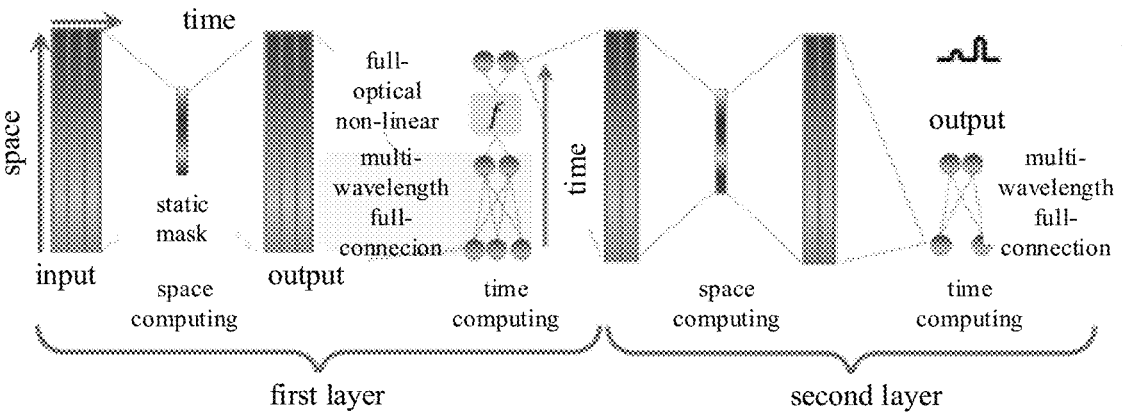
FIG. 9 (*a*) is a schematic diagram illustrating a structure of a WMUX-STPC network according to an embodiment of the present disclosure.
Figure 9:
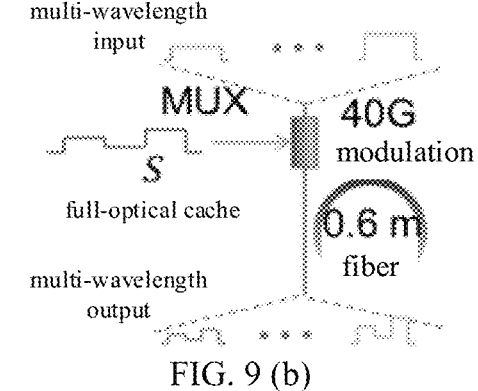
Figure 9:
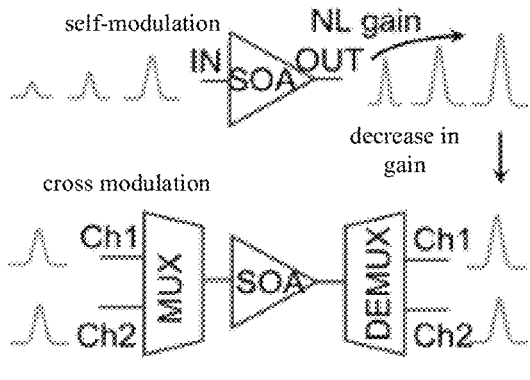
Figure 9:
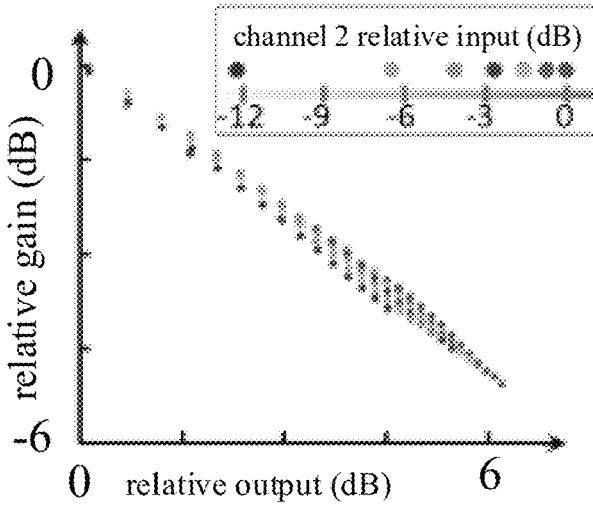
Figure 9:
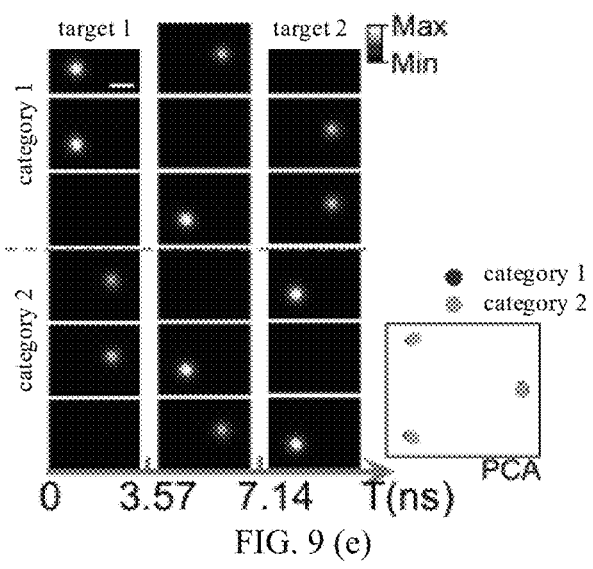
Figure 9:
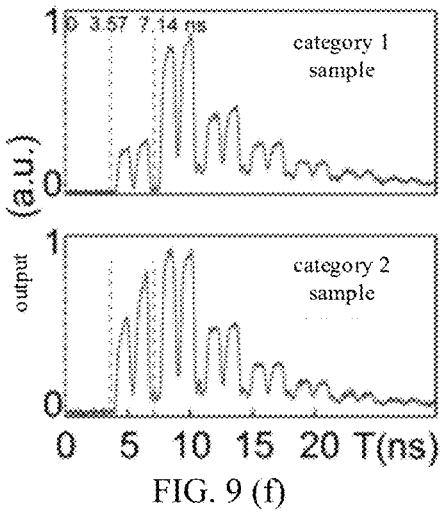
Figure 9:
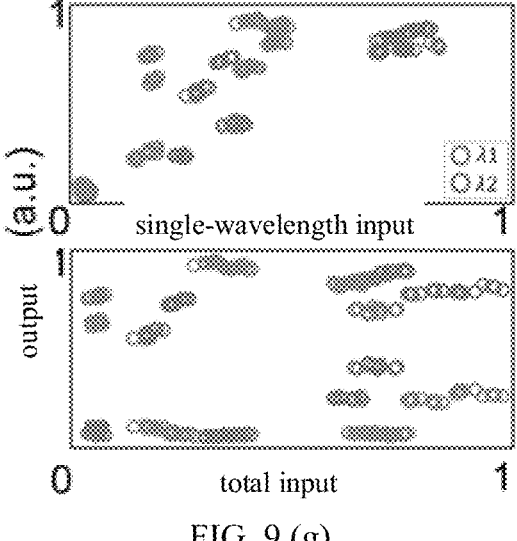
Figure 9:
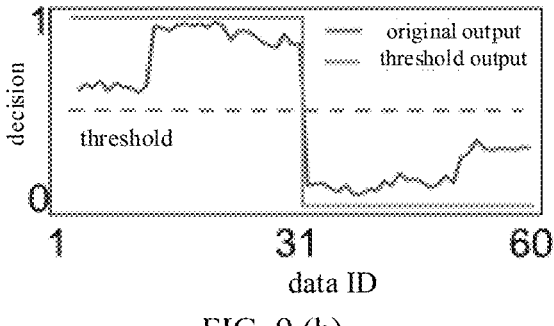
Figure 9:
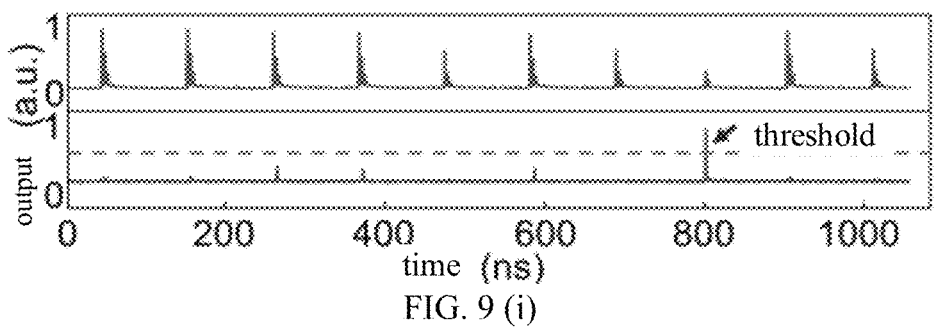

FIG. 9 (*a*) is a diagram illustrating a structure of a WMUX-STPC network provided in an embodiment of the present disclosure. As illustrated in FIG. 9 (*a*), in order to retain space information in a time channel and implement full-process optical processing of a large spectral bandwidth, a two-layer all-optical non-linear WMUX-STPC network is constructed. Specifically, a spatial optical field is encoded on a wavelength dimension and multiplexed (MUX) to a single channel. Different space (wavelength) channels share a multiplication weight and are repeatedly accumulated, that is, an optical field dynamic in a time channel is weighted and repeatedly accumulated in an all-optical cache. Space information is compressed in space and saved to a spectrum over each time period. Thus, space content is calculated in parallel by using broadband modulation characteristics of an optical modulator. An all-optical nonlinear module between layers receives a multispectral input, and an output of which is demultiplexed after non-linear activation. All-optical non-linearity between two layers may be achieved by a non-linear gain of stimulated emission. When a space input is encoded on different wavelengths, the multi-wavelength input may be multiplexed to a time channel without sacrificing the space information due to a large spectral bandwidth. Therefore, a structure of the WMUX-STPC is suitable for processing an ultra-high-speed visual dynamic.

FIG. 9 (*b*) is a diagram illustrating a fully-connected structure of a WMUX-STPC network provided in an embodiment of the present disclosure. As illustrated in FIG. 9 (*b*), in a space computing module, space content is computed by means of a static mask of the spatial modulation on a digital micromirror device (DMD) at an optical speed. Thereafter, the space content is squeezed into a single time fiber channel and a weighted full connection is achieved on time by a 40 GHz intensity modulator (MOD) and a 0.6 m fiber cache in a time dimension. Specifically, multispectral space outputs are multiplexed to a time channel, modulated with a 40 GHz MOD, and repeatedly accumulated in an optical time sequence cache consisting of a fiber loop of 0.6 meter.

FIG. 9 (*c*) is a diagram illustrating a modulation of a WMUX-STPC network provided in an embodiment of the present disclosure. FIG. 9 (*c*) illustrates all-optical nonlinearity of a stimulated emission process of a semiconductor optical amplifier (SOA), and has non-linear self-gain modulation and cross-gain modulation. The result indicates that a gain coefficient of the SOA is related to an input power and decreases as the input power increases. For self-gain modulation of input and output signals with a same wavelength, an increase in the input power will result in an increase in the output power and a decrease in the gain coefficient. For a multispectral input, an increase in the input power of one wavelength may result in a reduction in a total gain of the SOA and further a decrease in output powers of other wavelengths.

FIG. 9 (*d*) is a diagram illustrating a modulation result of a WMUX-STPC network provided in an embodiment of the present disclosure. As illustrated in FIG. 9 (*d*), a left figure is a highly nonlinear region of the SOA measured experimentally, in which data points with a same color represent a same control power, and a right figure is measurement results of self-gain modulation and cross-gain modulation. Specifically, an output power of Ch1 (Ch2 as a control channel) is measured by scanning input powers of Ch1 and Ch2 by using the highly nonlinear region, so that a gain coefficient related to a total input power may be clearly observed. When an input power corresponding to one wavelength is increased, an output power of a corresponding channel may increase nonlinearly while an output of the other channel may be reduced nonlinearly, which is a result of a decrease in a total gain. In the related art, most of optical nonlinear neuron activation functions are concentrated on a single-variable input model, that is, an output of a specific channel only depends on its input. In the present disclosure, a novel multi-variable optical nonlinear function is provided by modeling of the nonlinearity of the self-modulation and the cross modulation for different spectral channels.

The experiment configures a high speed dynamic scene, including two spherical objects flashing in a nanosecond-level time scale (3.57 ns per frame), to verify a performance of the proposed method in high speed processing. The experiment may construct a sequence data set having two different flickering sequences, including, for example, that an object 1 flickers first or an object 2 flickers first. Each dynamic includes three frames in which one object may flicker within a period of time. A training data set includes 180 samples, a test data set includes 60 samples, and each sample has different flicker intensity Due to a limited frame rate of an existing camera, it's not easy to capture a frequent and continuous flicker mode and distinguish a flickering sequence in the experiment. FIG. 9 (*e*) is a diagram illustrating display of a data set of a WMUX-STPC network provided in an embodiment of the present disclosure. As illustrated in FIG. 9 (*e*), an example of a dynamic data set is slowed down and monitored with an InGaAs camera. A sequence of the data set is projected into a two-dimensional manifold based on principal component analysis (PCA), data of two categories are distributed in three clusters and overlap each other, and the clusters are not linearly separable because category features originate from a relevance between spatial discrimination and the time flickering sequence of two objects.

Moreover, a two-layer WMUX-STPC model may be configured to classify dynamic scenarios which are based on pre-calibrated parameters. Specifically, a space content of each frame of input is encoded on two different wavelengths. An amplitude weighting is performed on the space input in space through the digital micromirror device (DMD). Thereafter, signals are compressed into one fiber channel through the WMUX. In a time channel, time-weighted connections of 3×2 and 2×2 are implemented by the intensity modulator and the optical time sequence cache respectively at first and second layers of the WMUX-STPC network. Multi-spectral output of a first layer enters the SOA and is activated nonlinearly, and the output of the SOA is finally demultiplexed by a DWDM multiplexer and then sent to a time computing module of a second layer to infer a final computing result.

FIG. 9 (*f*) is a diagram illustrating an output of a WMUX-STPC network provided in an embodiment of the present disclosure. FIG. 9 (*f*) illustrates output dynamics of samples of a first category and samples of a second category of sample of a first layer of the WMUX-STPC, with a frame interval of 3.57 ns, and a duration of a time-weighted slot of 1.78 ns.

FIG. 9 (*g*) is a diagram illustrating a nonlinear activation of a WMUX-STPC network provided in an embodiment of the present disclosure. FIG. 9 (*g*) illustrates a non-linear activation of the test data set, and a relationship between outputs of different wavelengths and inputs of the respective wavelengths, and a relationship between outputs of different wavelengths and a total input. A multi-wavelength input-output transfer relationship is highly non-linear since an output power level depends on an input power of each wavelength and a total input power.

FIG. 9 (*h*) is a diagram illustrating a result of a WMUX-STPC network provided in the embodiment of the present disclosure. As illustrated in FIG. 9 (*h*), the WMUX-STPC network successfully classifies the entire test data set through a non-linear multilayer structure, and is greatly consistent with a simulation result. A first half part (a first category) of the data set and a second half part (a second category) of the data set are clearly distinguished by setting an appropriate threshold value (marked by a dashed line).

FIG. 9 (*i*) is a diagram illustrating dynamic monitoring of a WMUX-STPC network provided in an embodiment of the present disclosure. As illustrated in FIG. 9 (*i*), the system is configured to be in a continuous working mode and to monitor continuous high speed dynamics, in which a frame rate is 10 MHz, and a frame time is 3.57 ns. The input sequence flickers at a repetition rate up to 10 MHz. Flickering of one sequence in continuous sequences is different, and the WMUX-STPC network may successfully determine a location of an outlier. It indicates that the all-optical WMUX-STPC network may perform a real-time processing, have a response time in a nanosecond level, and apply a finally output for real-time feedback control of the system.

In addition, in order to further increase a processing speed of the system, a round-trip delay of the optical time sequence cache in the WMUX-STPC may be minimized on a photonic integrated circuit platform. With a low loss silicon nitride platform on an insulator, a ring resonator with a 1.4 mm ring length may reduce a delay time to 10 ps by means of numerical verification. In contrast, a read/write time of a matrix multiplication and a memory in an electronic system is much longer. Each read-calculation-write cycle averagely consumes at least 4 microseconds, which is three orders of magnitude longer than a dynamic optical field framework time (3.57 ns).

In summary, the WMUX-STPC network provided in the embodiment of the present disclosure improves a performance of a photonic neural network, causing real-time analysis of a dynamic visual scene to be reduced to a nanosecond level, and a speed to be expanded to a picosecond magnitude, which far exceeds a time of image transmission and memory access. The WMUX-STPC network supports ultra-high-speed optical machine vision with multi-wavelength inputs and allows for identification of changing of visual dynamics within a time of 3.57 nanoseconds per frame. Introduction of multivariable all-optical nonlinearity effectively improves a performance of the STPC network in linear irreversibility, and the two-layer all-optical non-linear STPC network recognizes an ultrafast transient sequence at a nanosecond-level time magnitude, without being affected by a read/write delay of the memory. In addition, a burden of reading and writing of the memory may be eliminated by jointly optimizing and calculating, docking and buffering modules in a spatiotemporal computing field. In addition, with recent advancements in the optical modulator and a detector, a bandwidth may reach hundreds of GHz, and a time resolution of the STPC is potential to exceed 10 ps or even higher combined with the low-loss photonic integrated circuit. A high speed and continuous computing capability not only accelerates computing of a neural network, but also supports real-time analysis on a non-repeated transient vision phenomenon, which helps achieve feedback control of a dynamic optical field optical chip with a frequency above GHz. The spatiotemporal optical computing architecture broadens a range of photon computing, and lays a road for ultrafast advanced machine vision and transient experiment control of the optical domain.

In the technical solution of the present disclosure, processings such as acquisition, storage, use, processing, transmission, provision and disclosure of user personal information involved in the present disclosure conform to the provisions of relevant legal regulations, and do not violate the public-order yield.

The below are system embodiments of the present disclosure, which may be configured to implement the method embodiments of the present disclosure. For details not disclosed in the system embodiments of the present disclosure, please refer to the method embodiments of the present disclosure.

Figure 10:
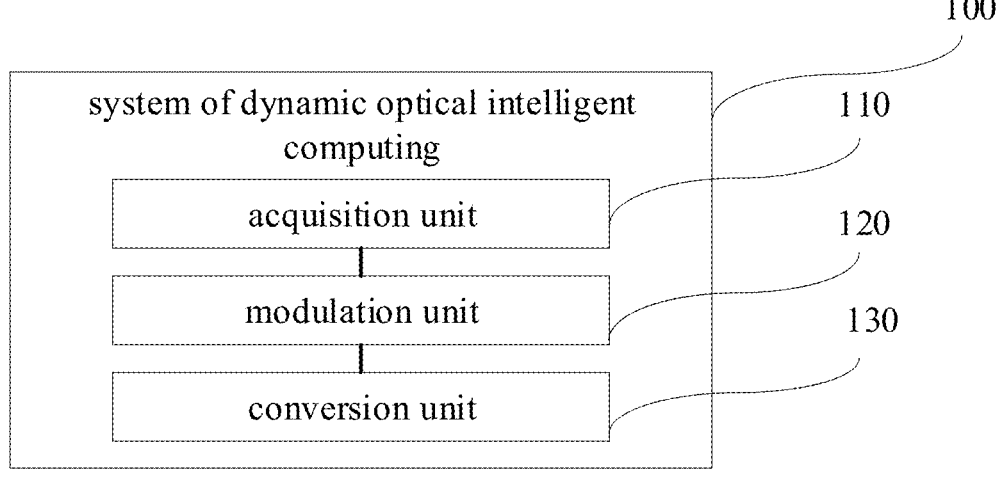
FIG. 10 is a block diagram illustrating an apparatus of dynamic optical intelligent computing according to an embodiment of the present disclosure.

FIG. 10 is a diagram illustrating a structure of a system of dynamic optical intelligent computing according to an embodiment of the present disclosure. The system may be a part or all of a system through software, hardware or their combination. The system 100 includes an acquisition unit 110, a modulation unit 120 and a conversion unit 130.

The acquisition unit 110 is configured to acquire a time frame input from a target dynamic scene;

the modulation unit 120 is configured to obtain space information corresponding to the time frame by performing a spatial modulation on the time frame; and the conversion unit 130 is configured to obtain an optical time sequence cache corresponding to the time frame by mapping the space information to an optical time sequence based on a space division multiplexing (SMUX) technology and a wavelength division multiplexing (WMUX) technology.

Optionally, when obtaining the space information corresponding to the time frame by performing the spatial modulation on the time frame, the modulation unit 120 is specifically configured to:

obtain at least one spatial feature space by performing at least one spatial modulation on the time frame based on at least one spatial mask; and determine space information corresponding to the time frame based on the at least one spatial feature space.

Optionally, when obtaining the optical time sequence cache corresponding to the time frame by mapping the space information to the optical time sequence based on the SMUX technology and the WMUX technology, the conversion unit 130 is specifically configured to:

determine a wavelength input type corresponding to the space information;

determine time information corresponding to the space information based on the SMUX technology in response to the wavelength input type being a single-wavelength input, in which the time information includes at least one piece of time feature information, and the at least one piece of time feature information corresponds one to one with the at least one spatial feature space;

determine the time information corresponding to the space information based on the WMUX technology in response to the wavelength input type being a multi-wavelength input;

obtain an optical time sequence corresponding to the time frame by performing a time modulation on the time information based on a weight sequence, in which, the weight sequence includes at least one weight value, and the at least one weight value corresponds one to one with the at least one piece of time feature information; and obtain the optical time sequence cache corresponding to the time frame by processing the optical time sequence by means of a transfer function.

Optionally, when obtaining the optical time sequence corresponding to the time frame by performing the time modulation on the time information based on the weight sequence, the conversion unit 130 is specifically configured to:

obtain the optical time sequence corresponding to time frame by multiplying at least one weight value by the at least one piece of time feature information respectively by means of a matrix-vector multiplication mathematical model.

Optionally, when determining the time information corresponding to the space information based on the SMUX technology, the conversion unit 130 is specifically configured to:

divide each of the at least one spatial feature space into at least one spatial feature subspace, and obtain the at least one piece of time feature information corresponding to the at least one spatial feature space by modulating the at least one spatial feature subspace by means of a high speed spatial modulator, in which the time feature information includes at least one time channel, and the at least one time channel corresponds one to one with the at least one spatial feature subspace; and determine the time information corresponding to the space information based on the at least one piece of time feature information corresponding to the at least one spatial feature space.

Optionally, when determining the time information corresponding to the space information based on division WMUX technology, the conversion unit 130 is specifically configured to:

encode the at least one spatial feature space with at least one wavelength, and encode the at least one spatial feature space with at least one spectrum by means of the WMUX, in which, the at least one spatial feature space corresponds one to one with the at least one spectrum; and encode the time information corresponding to the space information based on the at least one spectrum.

Optionally, the acquisition unit 110 is further configured to obtain at least one optical time sequence cache corresponding to the at least one time frame by successively acquiring the at least one time frame input from the target dynamic scene based on a time sequence;

the conversion unit 130 is configured to obtain an optical time sequence cache of a dynamic optical field corresponding to the at least one time frame by successively combining the at least one optical time sequence cache based on the time sequence.

Optionally, the system 100 further includes a cache activation unit, a cache demultiplexing unit and a determination unit.

When the optical time sequence cache of the dynamic optical field corresponding to the at least one time frame is obtained, the cache activation unit is configured to obtain an activated optical time sequence cache of the dynamic optical field by performing an optical nonlinear activation on the optical time sequence cache of the dynamic optical field;

the cache demultiplexing unit is configured to obtain space information of the dynamic optical field corresponding to the activated optical time sequence cache of the dynamic optical field by demultiplexing the optical time sequence cache of the dynamic optical field; and the determination unit is configured to determine feature information of the dynamic optical field corresponding to the at least one time frame based on the space information of the dynamic optical field.

It should be noted that, when the system of dynamic optical intelligent computing provided in the above embodiments performs the method of dynamic optical intelligent computing, only division of the above function modules is illustrated. In practical applications, allocation of the above functions may be completed by different function modules according to requirements, that is, the internal structure of the device is divided into different function modules to complete all or part of functions described above. In addition, the system of dynamic optical intelligent computing provided in the embodiments and the method of dynamic optical intelligent computing embodiments belong to the same concept. For the implementation process, please refer to the method embodiment, which is not repeated here.

In summary, in the system provided in the embodiment of the present disclosure, the acquisition unit acquires the time frame input from the target dynamic scene; the modulation unit obtains the space information corresponding to the time frame by performing the spatial modulation on the time frame; and the conversion unit obtains the optical time sequence cache corresponding to the time frame by mapping the space information to the optical time sequence based on the SMUX technology and the WMUX technology. Therefore, the SMUX technology and the WMUX technology may cause matching of a highly parallel space output and a high speed time input, and fully retaining content information. The space content may be processed and mapped to a parallel dynamic time sequence to form a spatiotemporal feature space compatible with time computing, and a dimension of optical vision computing may be expanded from a 2D space image to a 3D spatiotemporal optical field, which may effectively calculate and convert between a spatial optical field and a temporal optical field. At the same time, fast-changing optical signals are stored and combined by means of the optical time sequence cache, so that features may be delayed and reproduced in an optical domain.

In the technical solution of the present disclosure, processings such as acquisition, storage, use, processing, transmission, provision and disclosure of user personal information involved in the present disclosure conform to the provisions of relevant legal regulations, and do not violate the public-order yield.

A terminal, a readable storage medium and a computer program product are further provided according to embodiments of the present disclosure.

Figure 11:
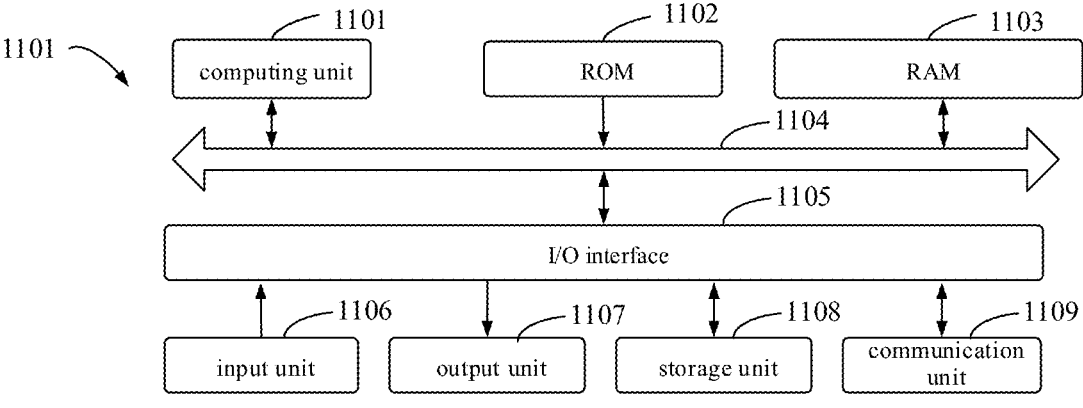
FIG. 11 a block diagram illustrating a terminal for implementing a method of dynamic optical intelligent computing according to an embodiment of the present disclosure.

FIG. 11 is a schematic block diagram illustrating an example terminal 1100 in the embodiment of the present disclosure. The components shown herein, their connections and relations, and their functions are merely examples, and are not intended to limit the implementation of the disclosure described and/or required herein.

As illustrated in FIG. 11, the terminal 1100 includes a computing unit 1101, configured to execute various appropriate actions and processings according to a computer program stored in a read-only memory (ROM) 1102 or loaded from a storage unit 1108 to a random access memory (RAM) 1103. In the RAM 1103, various programs and data required for the terminal 1100 may be stored. The computing unit 1101, the ROM 1102 and the RAM 1103 may be connected with each other by a bus 1104. An input/output (I/O) interface 1105 is also connected to the bus 1104.

A plurality of components in the terminal 1100 are connected to an I/O interface 1105, and includes: an input unit 1106, for example, a keyboard, a mouse, etc.; an output unit 1107, for example, various types of displays, speakers; a storage unit 1108, for example a magnetic disk, an optical disk; and a communication unit 1109, for example, a network card, a modem, a wireless transceiver. The communication unit 1109 allows the terminal 1100 to exchange information/data through a computer network such as internet and/or various types of telecommunication networks and other devices.

The computing unit 1101 may be various types of general and/or dedicated processing components with processing and computing ability. Some examples of the computing unit 1101 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 1101 executes various methods and processings as described above, for example, a method of dynamic optical intelligent computing. For example, in some embodiments, the method of dynamic optical intelligent computing may be further implemented as a computer software program, which is physically contained in a machine readable medium, such as the storage unit 1108. In some embodiments, a part or all of the computer program may be loaded and/or installed on the terminal 1100 through the ROM 1102 and/or the communication unit 1109. When the computer program is loaded on the RAM 1103 and executed by the computing unit 1101, one or more steps in the above method of dynamic optical intelligent computing may be performed. Alternatively, in other embodiments, the computing unit 1101 may be configured to perform a method of dynamic optical intelligent computing in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), a system on a chip (SoC), a load programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the present disclosure, a machine-readable medium may be a tangible medium that may contain or store a program intended for use in or in conjunction with an instruction execution system, apparatus, or device. A machine-readable medium may be a machine readable signal medium or a machine readable storage medium. The machine-readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an EPROM programmable read-only ROM (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method of dynamic optical intelligent computing, comprising:

acquiring a time frame input from a target dynamic scene;

obtaining space information corresponding to the time frame by performing a spatial modulation on the time frame; and obtaining an optical time sequence cache corresponding to the time frame by mapping the space information to an optical time sequence based on a space division multiplexing (SMUX) technology and a wavelength division multiplexing (WMUX) technology;

wherein obtaining the space information corresponding to the time frame by performing the spatial modulation on the time frame comprises:

obtaining at least one spatial feature space by performing at least one spatial modulation on the time frame based on at least one spatial mask; and determining the space information corresponding to the time frame based on the at least one spatial feature space;

wherein obtaining the optical time sequence cache corresponding to the time frame by mapping the space information to the optical time sequence based on the SMUX technology and the WMUX technology comprises:

determining a wavelength input type corresponding to the space information;

converting the space information to time information based on the SMUX technology in response to the wavelength input type being a single-wavelength input, wherein the time information comprises at least one piece of time feature information, and the at least one piece of time feature information corresponds one to one with the at least one spatial feature space;

converting the space information to the time information based on the WMUX technology in response to the wavelength input type being a multi-wavelength input;

obtaining an optical time sequence corresponding to the time frame by performing a time modulation on the time information based on a weight sequence, wherein, the weight sequence comprises at least one weight value, and the at least one weight value corresponds one to one with the at least one piece of time feature information; and obtaining the optical time sequence cache corresponding to the time frame by processing the optical time sequence by means of a transfer function.

2. The method according to claim 1, wherein obtaining the optical time sequence corresponding to the time frame by performing the time modulation on the time information based on the weight sequence comprises:

obtaining the optical time sequence corresponding to the time frame by multiplying the at least one weight value by the at least one piece of time feature information respectively by means of a matrix-vector multiplication mathematical model.

3. The method according to claim 1, wherein converting the space information to the time information based on the SMUX technology comprises:

dividing each of the at least one spatial feature space into at least one spatial feature subspace, and obtaining the at least one piece of time feature information corresponding to the at least one spatial feature space by modulating the at least one spatial feature subspace by means of a high speed spatial modulator, wherein the time feature information comprises at least one time channel, and the at least one time channel corresponds one to one with the at least one spatial feature subspace; and determining the time information corresponding to the space information based on the at least one piece of time feature information corresponding to the at least one spatial feature space.

4. The method according to claim 1, wherein converting the space information to the time information based on the WMUX technology comprises:

encoding the at least one spatial feature space with at least one wavelength, and encoding the at least one spatial feature space with at least one spectrum by means of the WMUX, wherein, the at least one spatial feature space corresponds one to one with the at least one spectrum; and encoding the time information corresponding to the space information based on the at least one spectrum.

5. The method according to claim 1, further comprising:

obtaining at least one optical time sequence cache corresponding to at least one time frame respectively by successively acquiring the at least one time frame input from the target dynamic scene based on a time sequence; and obtaining an optical time sequence cache of a dynamic optical field corresponding to the at least one time frame by successively combining the at least one optical time sequence cache based on the time sequence.

6. The method according to claim 5, after obtaining the optical time sequence cache of the dynamic optical field corresponding to the at least one time frame, further comprising:

obtaining an activated optical time sequence cache of the dynamic optical field by performing an optical nonlinear activation on the optical time sequence cache of the dynamic optical field;

obtaining space information of the dynamic optical field corresponding to the activated optical time sequence cache of the dynamic optical field by demultiplexing the activated optical time sequence cache of the dynamic optical field; and determining feature information of the dynamic optical field corresponding to the at least one time frame based on the space information of the dynamic optical field.

7. A system of dynamic optical intelligent computing, comprising:

at least one processor; and a memory communicatively connected to the at least one processor and stored with instructions executable by the at least one processor;

wherein when the instructions are executed by the at least one processor, the at least one processor is caused to perform:

acquiring a time frame input from a target dynamic scene;

obtaining space information corresponding to the time frame by performing a spatial modulation on the time frame; and obtaining an optical time sequence cache corresponding to the time frame by mapping the space information to an optical time sequence based on a space division multiplexing (SMUX) technology and a wavelength division multiplexing (WMUX) technology;

wherein the at least one processor is further configured to perform:

obtaining at least one spatial feature space by performing at least one spatial modulation on the time frame based on at least one spatial mask; and determining the space information corresponding to the time frame based on the at least one spatial feature space;

wherein the at least one processor is further configured to perform:

determining a wavelength input type corresponding to the space information;

converting the space information to time information based on the SMUX technology in response to the wavelength input type being a single-wavelength input, wherein the time information comprises at least one piece of time feature information, and the at least one piece of time feature information corresponds one to one with the at least one spatial feature space;

converting the space information to the time information based on the WMUX technology in response to the wavelength input type being a multi-wavelength input;

obtaining an optical time sequence corresponding to the time frame by performing a time modulation on the time information based on a weight sequence, wherein, the weight sequence comprises at least one weight value, and the at least one weight value corresponds one to one with the at least one piece of time feature information; and obtaining the optical time sequence cache corresponding to the time frame by processing the optical time sequence by means of a transfer function.

8. The system according to claim 7, wherein the at least one processor is further configured to perform:

obtaining the optical time sequence corresponding to the time frame by multiplying the at least one weight value by the at least one piece of time feature information respectively by means of a matrix-vector multiplication mathematical model.

9. The system according to claim 7, wherein the at least one processor is further configured to perform:

dividing each of the at least one spatial feature space into at least one spatial feature subspace, and obtaining the at least one piece of time feature information corresponding to the at least one spatial feature space by modulating the at least one spatial feature subspace by means of a high speed spatial modulator, wherein the time feature information comprises at least one time channel, and the at least one time channel corresponds one to one with the at least one spatial feature subspace; and determining the time information corresponding to the space information based on the at least one piece of time feature information corresponding to the at least one spatial feature space.

10. The system according to claim 7, wherein the at least one processor is further configured to perform:

encoding the at least one spatial feature space with at least one wavelength, and encoding the at least one spatial feature space with at least one spectrum by means of the WMUX, wherein, the at least one spatial feature space corresponds one to one with the at least one spectrum; and encoding the time information corresponding to the space information based on the at least one spectrum.

11. The system according to claim 7, wherein the at least one processor is further configured to perform:

obtaining at least one optical time sequence cache corresponding to at least one time frame respectively by successively acquiring the at least one time frame input from the target dynamic scene based on a time sequence; and obtaining an optical time sequence cache of a dynamic optical field corresponding to the at least one time frame by successively combining the at least one optical time sequence cache based on the time sequence.

12. The system according to claim 11, wherein the at least one processor is further configured to perform:

obtaining an activated optical time sequence cache of the dynamic optical field by performing an optical nonlinear activation on the optical time sequence cache of the dynamic optical field;

obtaining space information of the dynamic optical field corresponding to the activated optical time sequence cache of the dynamic optical field by demultiplexing the activated optical time sequence cache of the dynamic optical field; and determining feature information of the dynamic optical field corresponding to the at least one time frame based on the space information of the dynamic optical field.

13. A non-transitory computer-readable storage medium stored with computer instructions, wherein, the computer instructions are configured to cause a computer to perform:

acquiring a time frame input from a target dynamic scene;

obtaining space information corresponding to the time frame by performing a spatial modulation on the time frame; and obtaining an optical time sequence cache corresponding to the time frame by mapping the space information to an optical time sequence based on a space division multiplexing (SMUX) technology and a wavelength division multiplexing (WMUX) technology;

wherein obtaining the space information corresponding to the time frame by performing the spatial modulation on the time frame comprises:

obtaining at least one spatial feature space by performing at least one spatial modulation on the time frame based on at least one spatial mask; and determining the space information corresponding to the time frame based on the at least one spatial feature space;

wherein obtaining the optical time sequence cache corresponding to the time frame by mapping the space information to the optical time sequence based on the SMUX technology and the WMUX technology comprises:

determining a wavelength input type corresponding to the space information;

converting the space information to time information based on the SMUX technology in response to the wavelength input type being a single-wavelength input, wherein the time information comprises at least one piece of time feature information, and the at least one piece of time feature information corresponds one to one with the at least one spatial feature space;

converting the space information to the time information based on the WMUX technology in response to the wavelength input type being a multi-wavelength input;

obtaining an optical time sequence corresponding to the time frame by performing a time modulation on the time information based on a weight sequence, wherein, the weight sequence comprises at least one weight value, and the at least one weight value corresponds one to one with the at least one piece of time feature information; and obtaining the optical time sequence cache corresponding to the time frame by processing the optical time sequence by means of a transfer function.

14. The storage medium according to claim 13, wherein obtaining the optical sequence corresponding to the time frame by performing the time modulation on the time information based on the weight sequence comprises:

obtaining the optical time sequence corresponding to the time frame by multiplying the at least one weight value by the at least one piece of time feature information respectively by means of a matrix-vector multiplication mathematical model.

15. The storage medium according to claim 13, wherein converting the space information to the time information based on the SMUX technology comprises:

dividing each of the at least one spatial feature space into at least one spatial feature subspace, and obtaining the at least one piece of time feature information corresponding to the at least one spatial feature space by modulating the at least one spatial feature subspace by means of a high speed spatial modulator, wherein the time feature information comprises at least one time channel, and the at least one time channel corresponds one to one with the at least one spatial feature subspace; and determining the time information corresponding to the space information based on the at least one piece of time feature information corresponding to the at least one spatial feature space.

16. The storage medium according to claim 13, wherein converting the space information to the time information based on the WMUX technology comprises:

encoding the at least one spatial feature space with at least one wavelength, and encoding the at least one spatial feature space with at least one spectrum by means of the WMUX, wherein, the at least one spatial feature space corresponds one to one with the at least one spectrum; and encoding the time information corresponding to the space information based on the at least one spectrum.

17. The storage medium according to claim 13, further comprising:

obtaining at least one optical time sequence cache corresponding to at least one time frame respectively by successively acquiring the at least one time frame input from the target dynamic scene based on a time sequence; and obtaining an optical time sequence cache of a dynamic optical field corresponding to the at least one time frame by successively combining the at least one optical time sequence cache based on the time sequence.

18. The storage medium according to claim 17, after obtaining the optical time sequence cache of the dynamic optical field corresponding to the at least one time frame, further comprising:

obtaining an activated optical time sequence cache of the dynamic optical field by performing an optical nonlinear activation on the optical time sequence cache of the dynamic optical field;

obtaining space information of the dynamic optical field corresponding to the activated optical time sequence cache of the dynamic optical field by demultiplexing the activated optical time sequence cache of the dynamic optical field; and determining feature information of the dynamic optical field corresponding to the at least one time frame based on the space information of the dynamic optical field.

* * * * *